(12) United States Patent
Amini et al.

(10) Patent No.: US 11,576,127 B2
(45) Date of Patent: Feb. 7, 2023

(54) MESH-BASED HOME SECURITY SYSTEM

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 81 days.

(21) Appl. No.: 16/231,183

(22) Filed: Dec. 21, 2018

(65) Prior Publication Data

US 2019/0259260 A1 Aug. 22, 2019

Related U.S. Application Data

(60) Provisional application No. 62/633,017, filed on Feb. 20, 2018.

(51) Int. Cl.
*H04N 5/232* (2006.01)
*G06T 7/20* (2017.01)
(Continued)

(52) U.S. Cl.
CPC ........ *H04W 52/0245* (2013.01); *G06F 9/542* (2013.01); *G06T 7/20* (2013.01);
(Continued)

(58) Field of Classification Search
CPC .. H04N 7/18; H04N 7/181; G06T 220/30232; H04W 36/30; H04W 84/18
See application file for complete search history.

(56) References Cited

U.S. PATENT DOCUMENTS 8,086,252 B2   12/2011 Luers
2005/0021724 A1*  1/2005 Kung .............. H04W 84/18
                                                  709/223
(Continued)

FOREIGN PATENT DOCUMENTS

CN      1618208 A     5/2005
CN    101070763 A    11/2007
(Continued)

OTHER PUBLICATIONS

Qi, LV, "Research on Measuring and Control Technology for the Intellectualization and Energy Saving in Green Home", China Master's Theses Full-text Database; I136-482, Dec. 15, 2011, 137 pages.
(Continued)

*Primary Examiner* — Jeremiah C Hallenbeck-Huber
(74) *Attorney, Agent, or Firm* — Perkins Coie LLP

(57) ABSTRACT

A network management system manages the operation of a home security system in a communication network, such as a mesh network. The home security system can include multiple components such as a camera, a lighting device, a security alarm, a doorbell switch and doorbell chime, and a fingerprint sensor, which connect with the communication network to perform various operations. The network management system monitors environmental parameters of the communication network, such as parameters associated with the access points and components of the home security system, determines an access point to which a component of the home security system is to be connected for efficient operation of the home security system, and connects the component to the communication network via the determined access point.

20 Claims, 15 Drawing Sheets

(51) Int. Cl.

| | |
|---|---|
| H04W 52/02 | (2009.01) |
| H04N 19/103 | (2014.01) |
| H04N 19/124 | (2014.01) |
| H04N 19/156 | (2014.01) |
| H04N 19/166 | (2014.01) |
| H04N 19/184 | (2014.01) |
| H04N 19/40 | (2014.01) |
| H04N 19/42 | (2014.01) |
| H04B 17/318 | (2015.01) |
| H04B 17/391 | (2015.01) |
| H05B 47/19 | (2020.01) |
| G07C 9/37 | (2020.01) |
| G06F 9/54 | (2006.01) |
| G08B 3/10 | (2006.01) |
| G08B 5/22 | (2006.01) |
| G08B 13/191 | (2006.01) |
| G08B 13/193 | (2006.01) |
| G08B 13/196 | (2006.01) |
| G08B 21/18 | (2006.01) |
| G08B 27/00 | (2006.01) |
| G08B 29/18 | (2006.01) |
| H04L 1/00 | (2006.01) |
| H04L 5/00 | (2006.01) |
| H04L 43/0852 | (2022.01) |
| H04L 43/12 | (2022.01) |
| H04L 43/16 | (2022.01) |
| H04L 65/80 | (2022.01) |
| H04L 67/1087 | (2022.01) |
| H04N 5/247 | (2006.01) |
| H04N 7/12 | (2006.01) |
| H04N 7/18 | (2006.01) |
| H04N 17/00 | (2006.01) |
| H04W 24/08 | (2009.01) |
| H04W 24/10 | (2009.01) |
| H04W 28/02 | (2009.01) |
| H04W 36/00 | (2009.01) |
| H04W 36/30 | (2009.01) |
| H04W 72/04 | (2009.01) |
| H05B 47/125 | (2020.01) |
| G06V 20/52 | (2022.01) |
| H04L 65/65 | (2022.01) |
| H04L 65/612 | (2022.01) |
| H04N 7/14 | (2006.01) |
| H04N 19/00 | (2014.01) |

(52) U.S. Cl.
CPC ............ *G06V 20/52* (2022.01); *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/1966* (2013.01); *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2022.05); *H04L 65/65* (2022.05); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/166* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0261* (2013.01); *H04W 72/042* (2013.01); *H04W 72/0453* (2013.01); *H05B 47/125* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | | |
|---|---|---|---|
| 2006/0094369 A1 | 5/2006 | Nguyen | |
| 2006/0179463 A1 | 8/2006 | Chisholm et al. | |
| 2009/0143078 A1 | 6/2009 | Tu et al. | |
| 2010/0081447 A1 | 4/2010 | Qi et al. | |
| 2010/0214943 A1* | 8/2010 | Immendorf | H04W 36/30 370/252 |
| 2011/0128389 A1* | 6/2011 | Maeda | H04N 21/25875 348/207.1 |
| 2011/0222449 A1* | 9/2011 | Goldberg | H04Q 9/00 370/311 |
| 2012/0185429 A1* | 7/2012 | Shu | H04W 24/08 707/609 |
| 2012/0287879 A1* | 11/2012 | Nentwig | H04W 76/36 370/329 |
| 2013/0107816 A1 | 5/2013 | Iraji et al. | |
| 2013/0120597 A1* | 5/2013 | Sakai | H04N 5/23245 348/207.11 |
| 2013/0322329 A1* | 12/2013 | Visuri | H04W 4/025 370/328 |
| 2013/0331097 A1* | 12/2013 | Kang | H04W 8/005 455/434 |
| 2014/0044113 A1* | 2/2014 | Chu | H04W 24/02 370/338 |
| 2015/0029333 A1* | 1/2015 | Ko | H04L 41/0816 348/143 |
| 2015/0154786 A1 | 6/2015 | Furukawa et al. | |
| 2015/0172958 A1* | 6/2015 | Allanki | H04W 48/06 370/235 |
| 2015/0195187 A1* | 7/2015 | Savolainen | H04W 40/02 370/401 |
| 2015/0195324 A1* | 7/2015 | Kim | H04L 65/607 709/219 |
| 2015/0205749 A1* | 7/2015 | Whitby-Strevens | G06F 13/426 348/207.11 |
| 2015/0333965 A1* | 11/2015 | Lee | H04L 12/4625 370/254 |
| 2016/0014679 A1* | 1/2016 | Taneja | H04W 48/16 455/434 |
| 2016/0050396 A1* | 2/2016 | Gali | H04N 7/181 348/159 |
| 2016/0050587 A1* | 2/2016 | Lam | H04W 36/22 370/235 |
| 2016/0105644 A1* | 4/2016 | Smith | H04N 5/232411 348/159 |
| 2016/0105847 A1* | 4/2016 | Smith | H04W 52/0206 370/252 |
| 2016/0134932 A1* | 5/2016 | Karp | G06F 9/546 348/155 |
| 2016/0286500 A1 | 9/2016 | Zur et al. | |
| 2016/0295172 A1* | 10/2016 | Cuddeback | H04W 52/02 |
| 2017/0142728 A1 | 5/2017 | Tsai et al. | |
| 2017/0163513 A1* | 6/2017 | Kim | H04B 17/318 |
| 2017/0163944 A1 | 6/2017 | Jeong | |

(56) References Cited

U.S. PATENT DOCUMENTS

| | | |
|---|---|---|
| 2017/0178475 A1 | 6/2017 | Renkis |
| 2017/0257261 A1 | 9/2017 | Monnerat |
| 2017/0278368 A1* | 9/2017 | Burke .............. G08B 13/19669 |
| 2017/0303138 A1* | 10/2017 | Barmettler ........ H04W 72/0453 |
| 2017/0318524 A1* | 11/2017 | Goto ..................... H04W 48/20 |
| 2017/0374567 A1* | 12/2017 | Takahashi ............. H04W 24/04 |
| 2018/0109999 A1* | 4/2018 | Finnegan .............. H04W 52/02 |
| 2019/0045407 A1* | 2/2019 | Logan ................... H04W 36/36 |
| 2019/0174383 A1 | 6/2019 | Zhang et al. |
| 2019/0239042 A1* | 8/2019 | Jahr ...................... H04W 12/04 |
| 2019/0261243 A1 | 8/2019 | Amini et al. |
| 2020/0145890 A1 | 5/2020 | Ma et al. |
| 2020/0186227 A1 | 6/2020 | Reider et al. |

FOREIGN PATENT DOCUMENTS

| | | |
|---|---|---|
| CN | 101547342 A | 9/2009 |
| CN | 102523435 A | 6/2012 |
| CN | 102547247 A | 7/2012 |
| CN | 102811370 A | 12/2012 |
| CN | 103369318 A | 10/2013 |
| CN | 103582168 A | 2/2014 |
| CN | 103945438 A | 7/2014 |
| CN | 104919788 A | 9/2015 |
| CN | 205028060 U | 2/2016 |
| CN | 105636078 A | 6/2016 |
| CN | 105792295 A | 7/2016 |
| CN | 105898471 A | 8/2016 |
| CN | 110177071 A | 8/2019 |
| CN | 110177398 A | 8/2019 |
| CN | 110191309 A | 8/2019 |

OTHER PUBLICATIONS

Yang, Chaofan, et al., "Enhancing Industrial Video Surveillance over Wireless Mesh", 2016 25th International Conference on Computer Communication and Networks, 44 pages.

* cited by examiner

MESH-BASED HOME SECURITY SYSTEM

CROSS-REFERENCE TO RELATED APPLICATION(S)

This application claims the benefit of U.S. Provisional Patent Application No. 62/633,017, entitled "OPTIMIZATION AND TESTING OF WIRELESS DEVICES" filed on Feb. 20, 2018, which is incorporated by reference herein in its entirety.

TECHNICAL FIELD

The disclosure is related to home security system, and more specifically to a wireless mesh network-based home security system.

BACKGROUND

A home security system typically includes smoke/fire detection, carbon monoxide (CO) detection, remote control, cameras, alarm and reporting events. The home security system is installed in a communication network, such as a local area network (LAN), which often is a wireless LAN (WLAN). The WLAN includes a gateway device, such as a modem, which connects the WLAN to an external network such as Internet, and one or more routers connected to the gateway device that generates the WLAN. The home security system can include multiple cameras, which can be installed at multiple locations of a home. When a user requests to view a video feed captured by a camera, the video feed is transmitted to a user device through the WLAN via the routers. Current home security systems do not operate efficiently. For example, when multiple users request to view the video feed from multiple cameras, the load in the WLAN, e.g., in the router to which the cameras are connected, can increase significantly, which can cause the streaming quality of the video to deteriorate. The user can experience buffering of the video, a lag or jitter in the video, or may not receive the video at all.

SUMMARY

The disclosure is related to a mesh-network based home security system. Embodiments include a network management system that manages the operation of the home security system in a communication network, such as a mesh network. The home security system can include multiple components such as a camera, a lighting device, a security alarm, a doorbell switch and doorbell chime, and a fingerprint sensor, which connect with the communication network to perform various operations. The home security system can also include a base station, which can coordinate various operations of the home security system, including establishing and managing a network connection for the components of the home security system with the communication network. In some embodiments, the communication network is a wireless local area network (WLAN), such as a home WLAN. The WLAN can be configured as a mesh network using multiple access points.

The network management system monitors environmental parameters of the communication network, such as parameters associated with the access points and the components of the home security system, determines whether to connect a component of the home security system to the communication network via an access point or the base station, and connects the component to the communication network via the base station the or the determined access point. For example, when the network management system receives a request from a camera to connect to the communication network, the network management system determines parameters such as a memory usage, central processing unit (CPU) usage, and/or a throughput of the base station and each of the access points; a signal strength between the camera and the base station; a signal strength between the camera and each of the access points; or hardware/software capability of the camera, determines an appropriate access point based on the environmental parameters and connects the camera to the determined access point. When a user requests for a video stream from the camera, the network management system forwards the request to the access point to which the camera is connected. Upon receiving the request, the access point obtains the video stream from the camera and transmits the video stream to a user device. The user device can be any network-enabled computing device associated with the user, such as a smartphone, a laptop, a tablet personal computer (PC), a desktop PC, a wearable device, or a smart TV.

DETAILED DESCRIPTION

Figure 1:
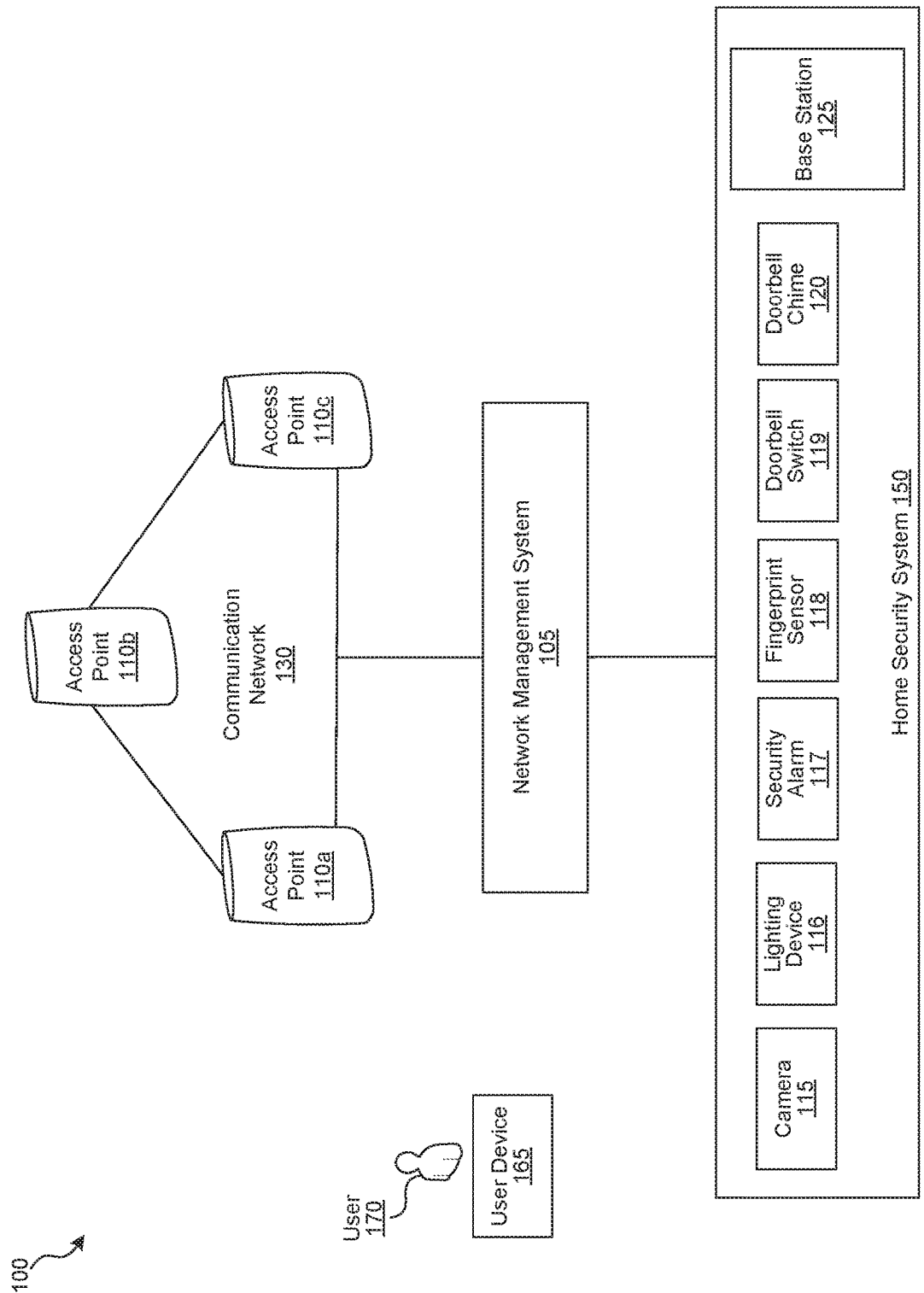
FIG. 1 is a block diagram illustrating an environment in which a mesh-based home security system can be implemented.

FIG. 1 is a block diagram illustrating an environment in which the mesh-based home security system can be implemented. The environment 100 includes a home security system 150 having multiple components, such as a camera 115, a lighting device 116, a security alarm 117, a fingerprint sensor 118, a doorbell switch 119 and a doorbell chime 120. The home security system 150 can include all or some of the above components, and can have one or more of any of the above components. In some embodiments, the home security system is a camera system that can be installed in a building, e.g., a house.

The home security system 150 operates in a communication network 130. The communication network 130 can be a local area network (LAN). In some embodiments, the communication network 130 is a wireless LAN (WLAN), such as a home Wi-Fi. In some embodiments, the communication network 130 can be configured as a wireless mesh network using multiple access points, such as access points 110a-c. A wireless mesh network is a communications network made up of radio nodes organized in a mesh topology. It is also a form of wireless ad hoc network. A mesh refers to rich interconnection among devices or nodes. Wireless mesh networks often consist of mesh access points 110, gateways and mesh clients, such as a user device 165 and home security system 150. In some embodiments, mobility of nodes in a wireless mesh is less frequent. If nodes were to constantly or frequently move, the mesh will spend more time updating routes than delivering data. In a wireless mesh network, topology tends to be more static, so that routes computation can converge and delivery of data to their destinations can occur. Hence, the wireless mesh network can be a low-mobility centralized form of wireless ad hoc network.

The mesh clients often include laptops, cell phones and other wireless devices while the mesh routers forward traffic to and from a gateway (not illustrated) which may, but need not, be connected to the Internet. The coverage area of the radio nodes working as a single network is sometimes called a mesh cloud. Access to this mesh cloud is dependent on the access points 110 working in harmony with each other to create the communication network 130. A mesh network is reliable and offers redundancy. When one access point can no longer operate, the mesh clients can still communicate with each other, directly or through one or more intermediate access points. Wireless mesh networks can self-form and self-heal. Wireless mesh networks work with different wireless technologies including 802.11, 802.15, 802.16, cellular technologies and need not be restricted to any one technology or protocol.

The home security system 150 can optionally include a base station 125. The base station 125 is a computer system that can securely connect the camera 115 to communication network 130. When a user 170 sends a request, e.g., from a user device 165, to view a live video feed from the camera 115, the base station 125 receives the request and in response to receiving the request, obtains the video stream from the camera 115, and streams the video stream to the user device 165. Upon receiving the video stream at the user device 165, a video player application in the user device 165 decodes the encoded video stream and plays the video on the user device 165. The user device 165 can be any computing device that can connect to a network and play video content, such as a smartphone, a laptop, a desktop, a tablet personal computer (PC), or a smart TV.

The base station 125 is connected to the communication network 130 by wired or wireless means. In some embodiments, the base station 125 is connected to the communication network 130 by wired means, e.g., Ethernet cable connection between the base station 125 and a gateway or one of the access points 110. However, the base station 125 can create its own wireless network and the camera 115 can connect to the base station 125, and therefore to the communication network 130, wirelessly. The communication network 130 can include multiple base stations to increase wireless coverage, which may be beneficial or required in cases where the cameras are spread over a large area.

The base station 125 can include various features such as long range wireless connectivity to the camera 115, connectivity to network attached storage (NAS), a siren, and can enhance battery life of the camera 115, e.g., by making the camera 115 work efficiently and keeping the communications between the base station 125 and the camera 115 efficient. The base station 125 can be configured to store the video captured from the camera 115 in any of a local storage device associated with the base station 125, the NAS, or a cloud storage service. The base station 125 can be configured to generate a sound alarm from the siren when an intrusion is detected by the base station 125. While the cameras 115 or other components of the home security system 150 can connect to the base station 125, the cameras 115 may also connect to the access points 110 instead of the base station 125, e.g., when the cameras are outside of the wireless coverage area of the base station 125 or the home security system does not have a base station in which case the access points can stream the video instead of the base station 125 to the user device 165. In some embodiments, the access points 110 have hardware and/or software capabilities of the base station 125 and can perform at least some of the tasks the base station 125 can perform. Note that the base station 125 and the access points 110a-c may be collectively referred to as "access points."

A network management system 105 facilitates the operation of the home security system 150 in the communication network 130. In some embodiments, the network management system 105 facilitates connecting the components of the home security system 150 to the communication network 130. The network management system 105 can establish a network connection for the home security system 150 such that the home security system 150 operates efficiently, e.g., a load on the base station 125 or any of the access points 110 is below a specified threshold, all components of the home security system 150 have sufficient wireless coverage, etc. When a component of the home security system 150 sends a request for connecting to the communication network 130, the network management system 105 selects one of the access points based on environmental parameters of the communication network 130 and connects the component to the selected access point. For example, if the base station 125 receives the connection request from a component, the network management system 105 executing in the base station 125 determines a specified access point to which the component is to be connected based on the environmental parameters. If the network management system 105 determines that the base station 125 is the suitable access point, then the network connection is established for the component by having the component connect to the base station 125. On the other hand, if the network management system 105 determines that another access point, e.g., access point 110*a*, is the suitable access point, then the base station 125 forwards the connection request to the access point 110*a*, which establishes the network connection for the component.

The environmental parameters of the communication network 130 include one or more of a signal strength between a component and each of the access points; a CPU usage, memory usage, and/or a throughput of the access points; or hardware/software capability of the component. The selection criterion for selecting an access point can include at least one of (a) a load of the access point not exceeding a first specified threshold, where the load is a function of one or more of CPU usage, memory usage or a throughput of the access point, (b) a signal strength between the component and the access point being above a second specified threshold, (c) number of devices connected to the access point not exceeding a third specified threshold, or (d) hardware and/or software compatibility between the access point and the component. The CPU usage, memory usage and throughput can each have a corresponding threshold. The selection criterion can be user-defined or learnt by the network management system 105 using artificial intelligence (AI) or machine learning (ML) techniques, e.g., based on usage pattern of the communication network 130 by the user 170.

The network management system 105 can apply the selection criteria in connecting a specified type of component, some components or all components of the home security system 150. The network management system 105 can be implemented in the base station 125 and/or one or more of the access points 110*a-c*. The components of the home security system 150 can connect to the access points wirelessly or via wired means, although, in some embodiments, the components connect to the access points wirelessly, e.g., via Wi-Fi, Wi-Fi direct, Wi-Fi ad hoc, Bluetooth or similar wireless connection technologies. For example, the doorbell switch 119 may connect to an access point or to another component, such as a camera 115, via Bluetooth. The following paragraphs describe various operations of the home security system 150.

Figure 2:
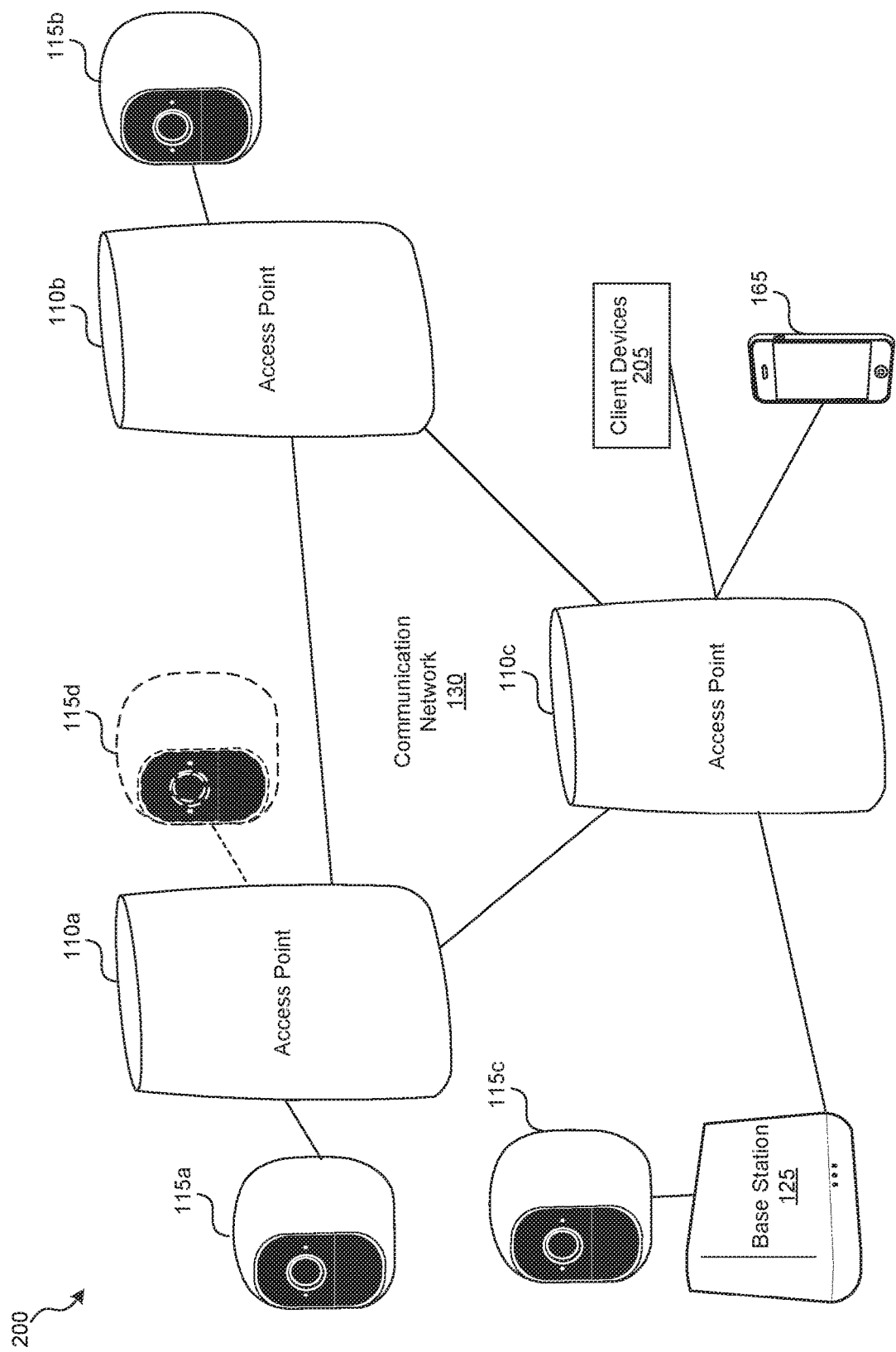
FIG. 2 is a block diagram of an example implementation of the mesh-based home security system having multiple security cameras, consistent with various embodiments.

FIG. 2 is a block diagram of an example implementation 200 of a mesh-based home security system having multiple security cameras, consistent with various embodiments. The access points 110*a-c* generate the communication network 130. The home security system 150 includes multiple cameras 115*a-d*. In some embodiments, the home security system 150 is installed in a building, such as a house. The communication network 130 can also include client devices 205, such as one or more of a laptop, gaming console, wearable device, smartphone, tablet PC, desktop PC, storage device, or NAS.

The cameras 115 can capture video feed, encode the video feed, and transmit the encoded video feed. The cameras 115 can encode the video feed using a codec such as H.264, H.265, MPEG-2, HEVC. Further, a file format of the encoded video feed can be one of many formats, e.g., AVI, MP4, MOV, WMA, or MKV. The encoded video feed can include audio as well if the cameras have audio capabilities, e.g., a speaker and/or a microphone. The cameras 115 can be battery powered or powered from a wall outlet. The cameras 115 can include one or more sensors, e.g., a motion sensor that can activate the recording of the video when a motion is detected. The cameras 115 can include infrared (IR) light emitting diode (LED) sensors, which can provide night-vision capabilities. The cameras 115 can be installed at various locations of the building. Further, all the cameras 115 in the home security system 150 can have the same features, or at least some of the cameras 115 can have different features. For example, one camera can have a night-vision feature while another camera may not, and one camera can be battery powered while another may be powered from a wall outlet. The encoded video stream from the cameras 115 can be transmitted to the user device 165 as a live or real-time video stream or can be stored at a storage device, which can include a local storage device associated with the base station 125 or any of the access points 110, a NAS or a cloud storage service (not illustrated).

In the communication network 130, the camera 115*a* is connected to the access point 110*a*, camera 115*b* to access point 110*b*, and camera 115*c* to base station 125. The communication network 130 may also have other client devices 205 (e.g., other computing devices or other components of the home security system 150) connected to the communication network 130. When the user 170 requests a video feed from a specified camera, the network management system 105 forwards the request to a specified access point to which the specified camera is connected. The specified access point obtains the video feed from the specified camera and streams the video feed to the user 170. The streamed video feed may be forwarded to the user 170 via one or more access points, e.g., depending on the access point to which the user device 165 is connected. For example, if the specified camera is camera 115*a* and the user device 165 is connected to the access point 110*c*, the access point 110*a* obtains the video feed from the camera 115*a* and streams the video feed to the user device 165 via the access point 110*c*. The user 170 can move around in the building and the user device 165 carried by the user 170 may connect to different access points depending where the user 170 is the building. For example, when the user 170 is at a basement of the building the user device 165 may be connected to the access point 110*b*, which can be in or near the basement, and when the user 170 is in the living room, the user device 165 may be connected to the access point 110*c*, which can be in or near the living room.

The network management system 105 monitors the environmental parameters of the communication network 130. These environmental parameters can be used in determining a specified access point to which a specified camera is to be connected. For example, when the user 170 adds a new camera, e.g., camera 115*d*, to the communication network 130, the camera 115*d* sends a request to the network management system 105 to connect to the communication network 130. The network management system determines the specified access point to which the camera 115*d* is to be connected based on the environmental parameters and connects the camera 115*d* to an access point that satisfies the selection criterion. For example, based on any of CPU usage, memory usage or a throughput of each of the access points, the network management system 105 can determine that since a load on the base station 125 and the access points 110*b-c* exceed a specified threshold and the load on the access point 110*a* is below the specified threshold, the access point 110*a* satisfies the selection criterion. In another example, the network management system 105 can determine that while a load of both the access point 110*a* and the base station 125 is below the specified threshold, since the wireless signal strength between the access point 110*a* and the camera 115*d* is better than the wireless signal strength between the base station 125 and the camera 115*d*, the access point 110*a* satisfies the selection criterion. In still another example, the network management system 105 can determine that regardless of a load on the access points, since the access point 110*a* is the only access point that has hardware/software compatibility with the camera 115*d*, the access point 110a satisfies the selection criterion. One example scenario where the hardware/software compatibility criterion plays a significant role is where the camera 115d is a 4K resolution camera, which requires sufficient memory availability in an access point (typically more than what is required for a HD camera) for streaming the video without any lag, jitter, buffering or drop in a quality of the video. Accordingly, the network management system 105 determines the access point 110a based on the environmental parameters as the suitable access point for establishing a network connection for the camera 115d and connects the camera 115d to the access point 110a.

Various such selection criteria can be used in selecting an access point for connecting any of the components of the home security system 150 to the communication network 130. As mentioned above, the selection criteria can be user-defined and/or learnt by the network management system 105 using AI or ML techniques, e.g., based on usage pattern of the communication network 130 by the user 170. In some embodiments, a load of the access point is considered exceeding a specified threshold when any of the CPU usage of the exceeds a first specified threshold, memory usage exceeds a second specified threshold, memory availability is below a third specified threshold, or throughput is below a fourth specified threshold. One or more of these thresholds are configurable, e.g., by the user 170 or the network management system. For example, using AI and ML techniques, the network management system 105 can analyze the usage of the access points in the communication network 130 over a period and can determine or predict load on the access points at various points of the day, week, or month and adjust the thresholds, or even modify the selection criterion, accordingly.

Figure 3:
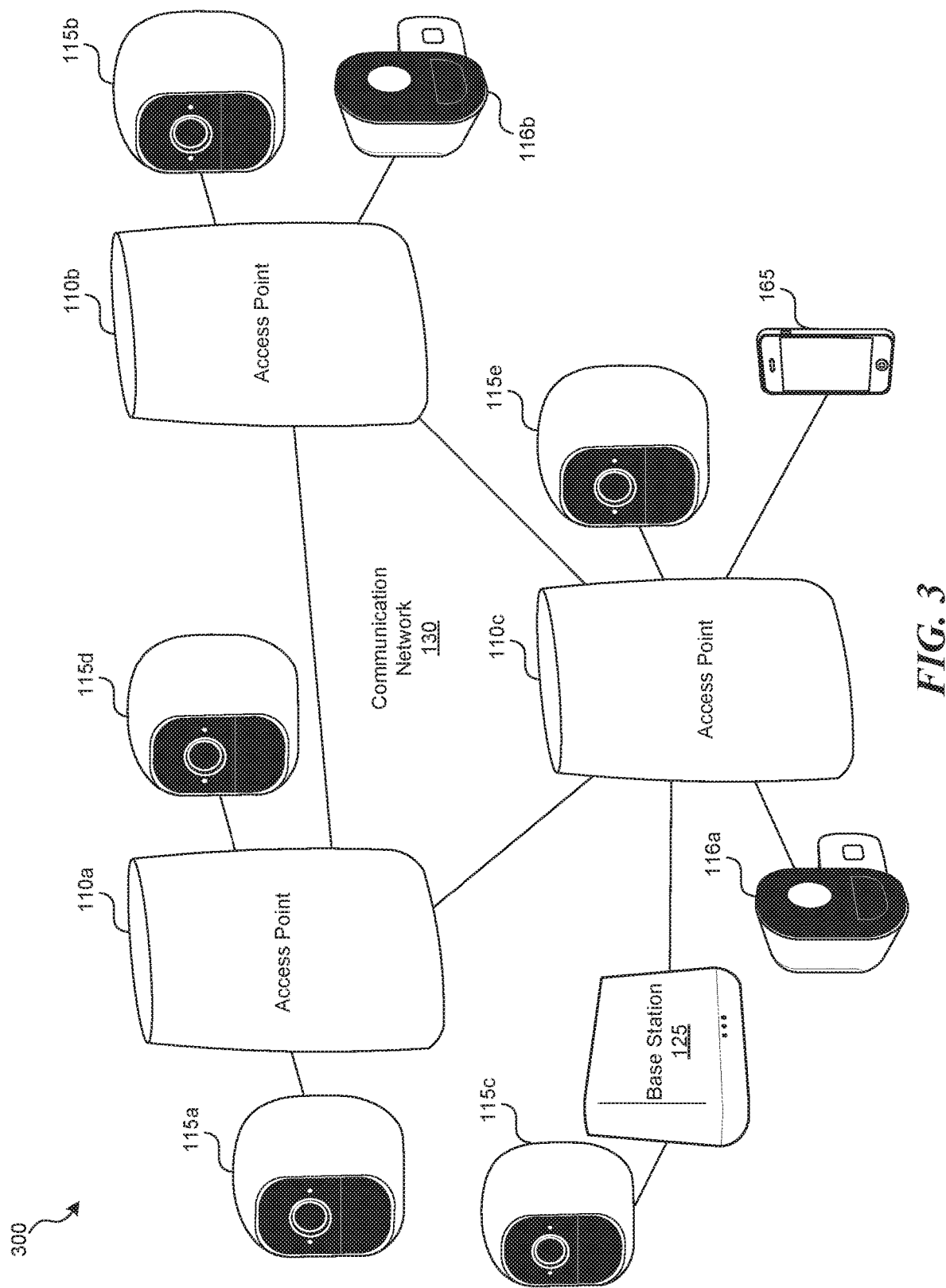
FIG. 3 is a block diagram of an example implementation of the home security system having cameras and lighting devices, consistent with various embodiments.

FIG. 3 is a block diagram of an example implementation 300 of the home security system having cameras and lighting devices, consistent with various embodiments. The home security system 150 includes multiple cameras 115a-e and lighting devices 116a-b. The lighting devices 116 can connect to the communication network 130 wirelessly or via wired means. In some embodiments, the lighting devices 116a connect to the communication network wirelessly. For example, the lighting devices 116 can connect to an access point (or the base station 125) via Bluetooth. At least some of the access points 110 have Bluetooth connectivity. The lighting devices 116 can be battery powered or be plugged into a wall outlet. The lighting devices 116 can include a motion sensor, which can detection motion. The lighting devices 116 can be configured to turn on when a motion is detected. In some embodiments, the lighting devices 116 can also be configured to turn on automatically when the amount of light around the lighting device is below a specified threshold. In some embodiments, the lighting devices 116 can also be configured to turn on in response to a detection of motion if the amount of light around the lighting device is below a specified threshold. The lighting devices 116 can have a sensor that can measure the amount of light around the lighting devices 116.

The network management system 105 determines the access point to which the lighting device is to be connected, e.g., based on the selection criterion described above. In some embodiments, the lighting devices 116 can also connect to another component of the home security system 150 such as a camera instead of connecting to an access point. For example, the lighting device 116a can wirelessly connect to the camera 115e, e.g., using Bluetooth. This can be advantageous in cases where the lighting devices are not in wireless coverage area (e.g., Bluetooth coverage area) of an access point.

In some embodiments, the lighting devices 116 be configured to turn on the light in response to a detection of motion by one or more of the cameras 115. For example, consider that the camera 115e is installed in a driveway or a walkway to a door of the house and the lighting device 116a is installed at or near the door. When the camera 115e senses a motion, e.g., when the user 170 returns home from work and gets down from his car in the driveway, the network management system 105 can send a command to the lighting device 116a to turn on the light. The network management system 105 can turn on more than one lighting device in response to the motion detected by the camera. For example, the network management system 105 can also send an instruction to the lighting device 116b, which can be installed near the stairway leading to the bedroom, to turn on the light so that the stairway is lit for the user 170 to climb the stairs.

The network management system 105 can be programmed to turn on specific lighting devices in response to specific events, e.g., based on location of the user 170, motion detection by cameras at specific locations. In some embodiments, the network management system 105 can turn on specific lighting devices 116 based on the location of the user 170 in the building. For example, if the user 170 is near or enters the basement of building, the network management system 105 can command the lighting device in the basement of the building to turn on. In another example, if the user 170 is climbing the stairway towards the bedroom, then the network management system 105 can command the lighting device in or near the bedroom. In still another example, if the user 170 is walking towards the backyard of the building, then the network management system 105 can command the lighting device in the backyard to turn on.

The network management system 105 can determine the location of the user 170 in various ways. In some embodiments, the network management system 105 can determine the location based on the location of the user device 165 the user 170 is carrying. The location of the user device 165 in respect to the access points can be determined using Wi-Fi triangulation technique. For example, by reading various parameters, such as antenna phase parameters, from the user device 165 and the access points 110 the network management system can determine where the user device 165 is, e.g., closer to which access point, and accordingly send an instruction to turn on one or more lighting devices connected to the access point which is closest to the user device 165. In another example, the network management system 105 can determine the location of the user 170 based on a frequency response of the signals from the access points. In this method, when two access points are communicating with each other, there is a frequency response of the signals between them, which vary when there are obstacles between them. So, when a user is moving between the access points, the frequency response of the signals vary—the frequency response of one access point increases while that of another decreases due to the user 170 moving away or towards the access point. The network management system 105 can determine the location of the user 170 in relation to the access points based on the variations in the frequency responses.

In some embodiments, network management system 105 can also turn a specific set of lighting devices in response to a detection of motion by one of the cameras 115. For example, when the user 170 returns home from work and gets down from his car in the driveway, the camera 115e installed in the driveway can detect the motion and the network management system 105 can send a command to a specific set of lighting devices to turn on the light, e.g., lighting device 116a at the main entrance door, lighting device 116b installed in the living room, a lighting device installed in the kitchen and a lighting device installed in the bedroom. The network management system 105 can turn the specific set of lights based on the current location of the user 170, e.g., which is determined as described above, or based on a prediction of the path to be taken by the user 170. The network management system 105 can predict the path to be taken by the user based on previous movements of the user 170 recorded by the network management system 105 over a period and using AI and ML techniques. For example, the network management system 105 can record user movements on a daily basis, e.g., gathered using location data from the user device 165, video from cameras 115, operation of lighting devices in specific areas, or data from other client devices 205. The network management system 105 can analyze such movement data and determine that when the user 170 comes back home from work, the camera 115e detects the motion, then the user 170 typically walks to the main door, then to kitchen, then to the bedroom, etc. The network management system 105 can use AI and ML techniques in making such a prediction.

The user 170 can also program the network management system 105 to turn on specific lights when the user is at specific locations. For example, the user 170 can define that when the user 170 is within 10 feet of an access point a first lighting device is to be turned on and a second lighting device when the user 170 is between 10 feet and 20 feet and so on. The user 170 can also program the network management system 105 to turn on specific lights in response to specific events. For example, the user 170 can program the network management system 105 to turn on a first set of lighting devices in response to a motion detected by camera 115e and a second set of lighting devices in response to a motion detected by camera 115a. In fact, the user 170 can program one or more components of the home security system 150, not just the lighting devices 116, to perform a specific task in response to a specific event. The network management system 105 provides a graphical user interface (GUI) using which the user 170 can program specific tasks to be performed by the components in response to specific events. Such a configuration can be stored in a database associated with the network management system 105.

For sending a command to turn on the lighting device 116b in response to detecting a motion by the camera 115e, the process can be as follows: in response to receiving an indication from the camera 115e that a motion is detected, the access point 110c determines (e.g., from the database) if there are any tasks to be performed in response to the detection and determines that the lighting device 116b is to be turned on. In some embodiments, the lighting device may not be specified in the database, but the network management system 105 may determine the lighting device itself, e.g., based on location of the user 170 or the prediction as described above. Upon determining that the lighting device 116b is to be turned on, the network management system 105 identifies the access point 110b to which the lighting device 116b is connected and sends an instruction to the access point 110b to command the lighting device 116b to turn on the light. The access point 110b can then send a command to the lighting device 116b to turn on the light.

Figure 4:
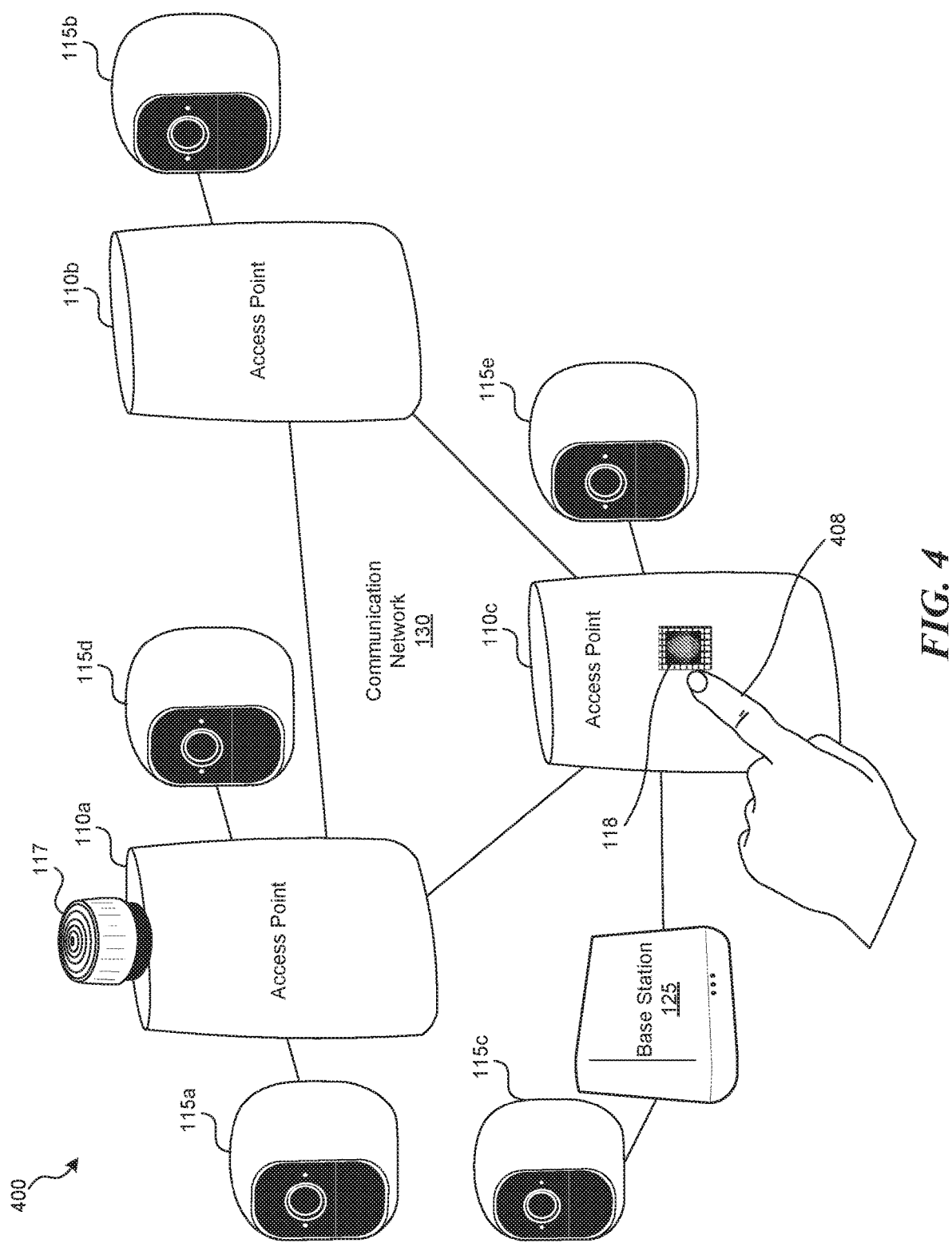
FIG. 4 is a block diagram of an example implementation of the home security system having a fingerprint sensor and a security alarm, consistent with various embodiments.

FIG. 4 is a block diagram of an example implementation 400 of a home security system having a fingerprint sensor and a security alarm, consistent with various embodiments. The home security system 150 includes multiple cameras 115a-e, a security alarm 117 and a fingerprint sensor 118. The fingerprint sensor 118 can be integrated into the access point 110c or can be a standalone unit, which can connect to the communication network 130 wirelessly or via wired means. For example, the fingerprint sensor 118 can connect to an access point (or the base station 125) via Bluetooth or Wi-Fi. Similarly, the security alarm 117 can be integrated into one or more of the access points, such as access point 110a or can be a standalone unit, which can connect to the communication network 130 wirelessly or via wired means. For example, the security alarm 117 can connect to an access point (or the base station 125) via Bluetooth or Wi-Fi.

The fingerprint sensor 118 can be used as an authentication device for performing various tasks. In some embodiments, the fingerprint sensor 118 is used as an authentication device for arming or disarming the home security system 150. For example, when the user 170 places a finger on the fingerprint sensor 118, the fingerprint sensor 118 obtains the fingerprint 408 the network management system 105 authenticates the user 170 and arms the home security system 150 if it is disarmed or disarms if it is armed. This eliminates the need for the user 170 to key in any code to arm/disarm the home security system 150. When the home security system 150 is armed, any intrusion detected by any of the cameras 115, e.g., based on a detection of motion, can trigger the security alarm 117. On the other hand, when the home security system 150 is disarmed, the security alarm 117 is not triggered when an intrusion is detected.

The home security system 150 can have multiple security alarms and the user 170 can program which of the security alarms have to be triggered in response to intrusion detection by which of the components (e.g., cameras 115) of the home security system 150. Such configurations may be stored in the database. For example, when a motion is detected by a camera 115c installed in the backyard, the user 170 may configure the network management system 105 to trigger the security alarm 117 that is inside the house, e.g., near the bedroom or in the living room, instead of or in addition to the security alarm in the backyard.

In response to detecting the motion by the camera 115c, the base station 125 determines (e.g., from the database) if there are any tasks to be performed in response to the detection when the home security system is armed and determines that the security alarm 117 is to be triggered. Upon determining that the security alarm 117 is to be triggered, the network management system 105 identifies the access point to which the security alarm 117 is connected, e.g., access point 110a, and sends an instruction to the access point 110a to command the security alarm 117 to trigger. The access point 110a can then send a command to the security alarm 117 to generate the alarm.

The user 170 can also configure the specified tasks to be performed by the components, e.g., deactivate, when the home security system 150 is disarmed. For example, the user 170 may configure the security alarms to deactivate but the cameras 115 to continue detecting motion when the home security system 150 is disarmed. In another example, the user 170 may choose to deactivate the security alarms and intrusion detection by a subset of the cameras 115 when the home security system 150 is disarmed.

Figure 5:
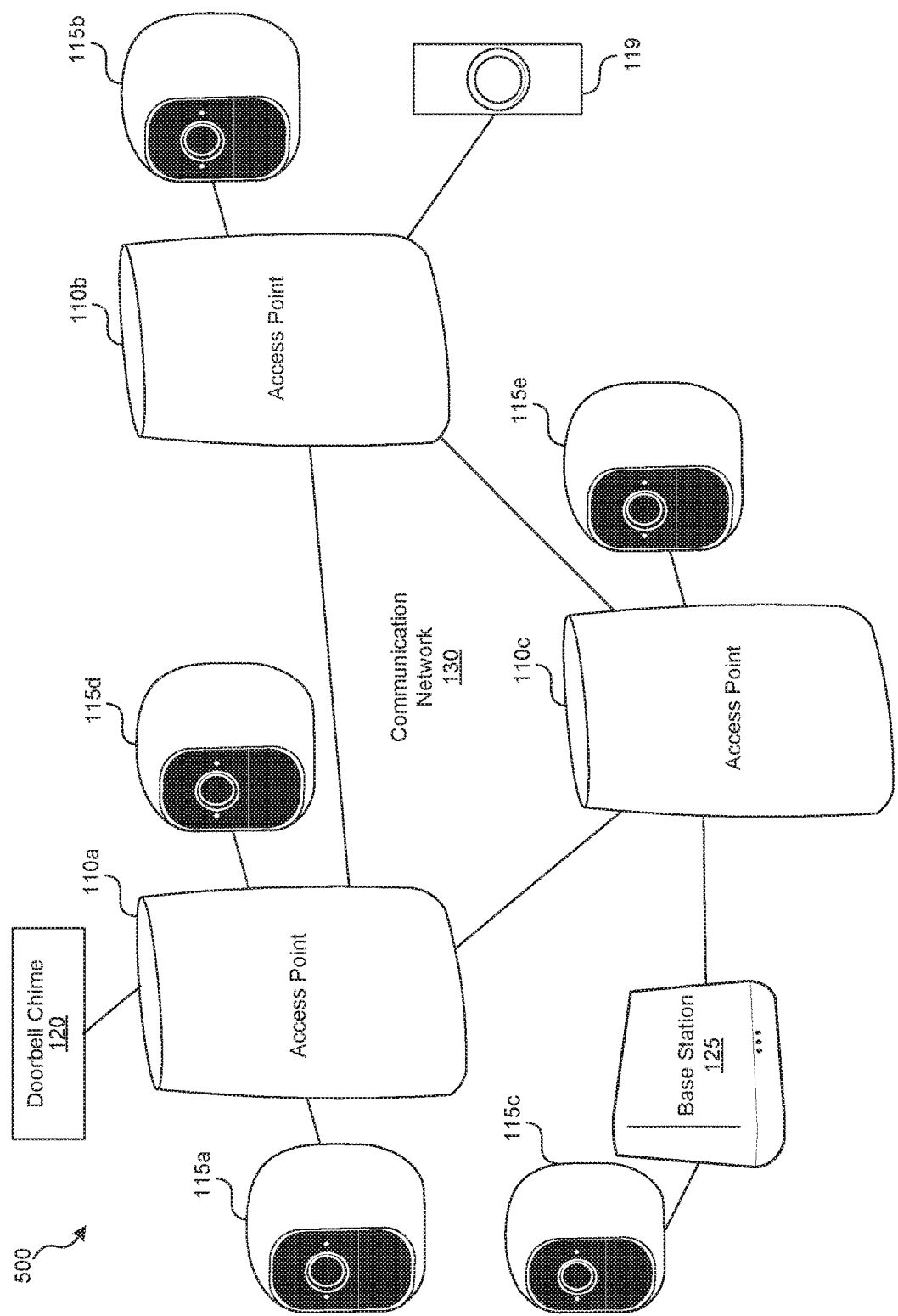
FIG. 5 is a block diagram of an example implementation of the home security system having a doorbell switch and a doorbell chime, consistent with various embodiments.

FIG. 5 is a block diagram of an example implementation 500 of a home security system having a doorbell switch and a doorbell chime, consistent with various embodiments. The home security system 150 includes multiple cameras 115a-e, a doorbell switch 119 for ringing a doorbell and a doorbell chime 120 that generates a chime in response to activating the doorbell switch 119. The doorbell switch 119 can connect to the communication network 130 wirelessly or via wired means. For example, the doorbell switch 119 can connect to an access point (or the base station 125 or a camera that is in proximity to the doorbell switch 119) via Bluetooth or Wi-Fi. Similarly, the doorbell chime 120 can connect to the communication network 130 wirelessly or via wired means. For example, the doorbell chime 120 can connect to an access point (or the base station 125) via Bluetooth or Wi-Fi.

Upon activating (e.g., pressing) the doorbell switch 119, an indication is sent to the access point 110b to which the doorbell switch 119 is connected to generate a chime. The access point 110b determines (e.g., from the database) if there are any tasks to be performed in response to the activation of the doorbell switch 119 and determines that the doorbell chime 120 is to be triggered. Upon determining that the doorbell chime 120 is to be triggered, the network management system 105 identifies the access point to which the doorbell chime 120 is connected, e.g., access point 110a, and sends an instruction to the access point 110a to command the doorbell chime 120 to generate the chime. The access point 110a can then send a command to the doorbell chime 120 to generate the chime. In an event the doorbell switch 119 is connected to the camera 115b, then upon activating (e.g., pressing) the doorbell switch 119, an indication is sent to the camera 115b regarding the activation of the doorbell switch 119, which the camera 115b forwards to the access point 110b and then the process proceeds from the access point 110b as explained above.

In some embodiments, in addition to generating the chime, the user 170 can configure the camera 115b to activated, e.g., capture video data, when the doorbell switch 119 is activated. The user 170 can define the tasks to be performed by one or more components of the home security system 150 when the doorbell switch 119 is activated and such configurations are stored in the database.

Figure 6:
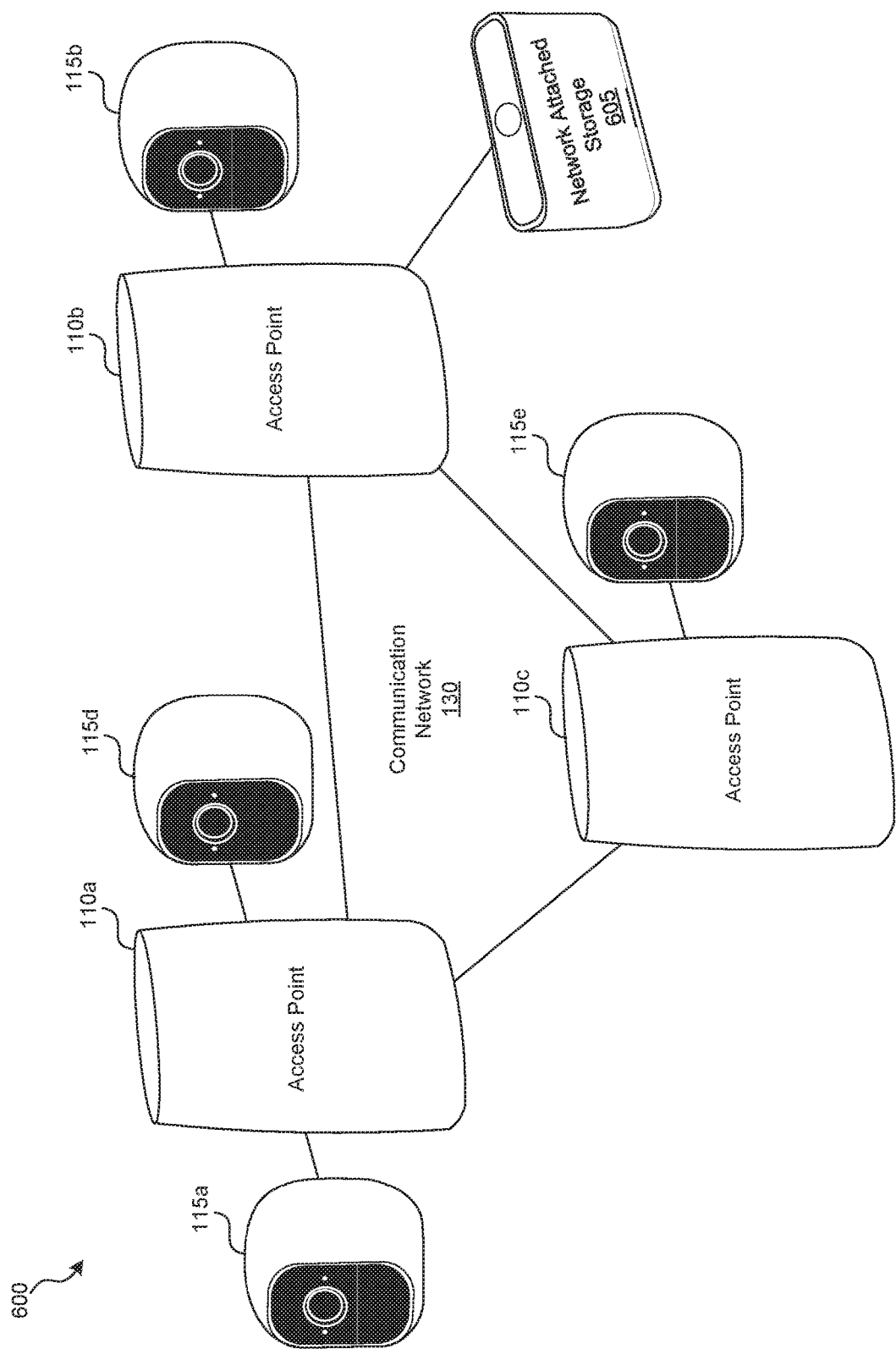
FIG. 6 is a block diagram of an example implementation of the home security system having a network attached storage (NAS), consistent with various embodiments.

FIG. 6 is a block diagram of an example implementation 600 of a home security system having a NAS, consistent with various embodiments. The home security system 150 includes multiple cameras 115a-b and 115d-e and a NAS 605 for storing data, e.g., video feed from cameras 115. The NAS 605 can be connected to the communication network 130 wirelessly or via wired means. In some embodiments, the NAS 605 is connected to an access point (or the base station 125) using wired means. Any data associated with the communication network 130, e.g., user data such as user profile, data from user device 165 or other client devices 205, video feeds from the cameras 115, network activity log, user configurations of the home security system 150. The home security system can have multiple NAS devices or local storage devices (e.g., local to an access point). Further, the user 170 can also define rules on storing data, e.g., a specified NAS device for a specified type of data, a specified NAS device for data from a specified source, backup rules etc.

Although different implementations of the home security system 150 is illustrated as having different components, the home security system 150 can have some or all of the components illustrated in FIG. 1. In some embodiments, the home security system 150 may not have the base station 125 and the access points 110 may perform the tasks of the base station 125.

Figure 7:
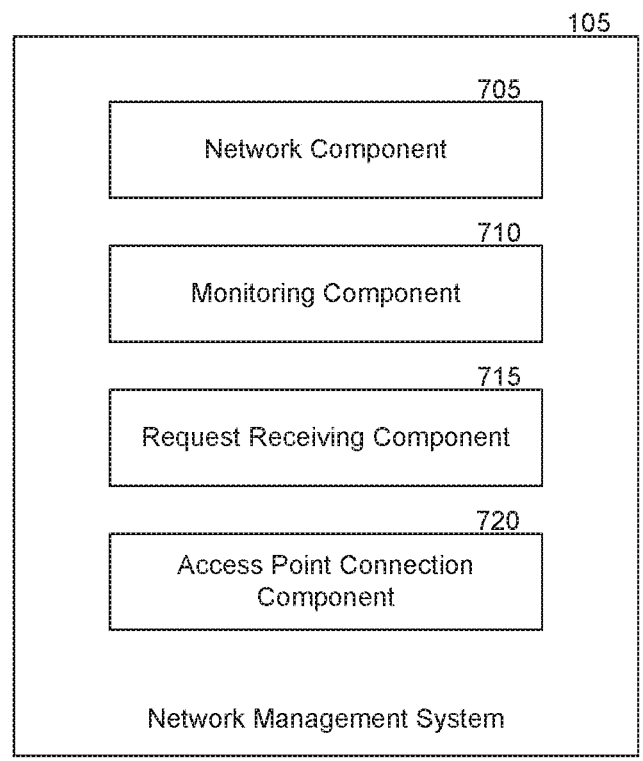
FIG. 7 is a block diagram of a network management system, consistent with various embodiments.

FIG. 7 is a block diagram of the network management system 105, consistent with various embodiments. The network management system 105 has multiple components including a network component 705, a monitoring component 710, a request receiving component 715, and an access point connection component 720. The network component 705 manages the network connection and operation of the home security system 150 in the communication network 130. The monitoring component 710 monitors various parameters, such as environmental parameters. The request receiving component 715 receives a request from the components of the home security system 150 for connecting to the communication network 130. The access point connection component 720 determines an appropriate access point to which a component of the home security system is to be connected and connects the component to the determined access point.

Additional details of the foregoing components are described at least with reference to FIGS. 8-14 below. Note that the network management system 105 illustrated in FIG. 7 is not restricted to having the above components. The network management system 105 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the network management system 105 can be implemented at a single computing device or distributed across multiple computing devices. For example, the network management system 105 can be executing at the base station 125 (if the home security system 150 has one) and all access points 110, or the components of the network management system 105 can be distributed across the base station 125 and the access points 110.

Figure 8:
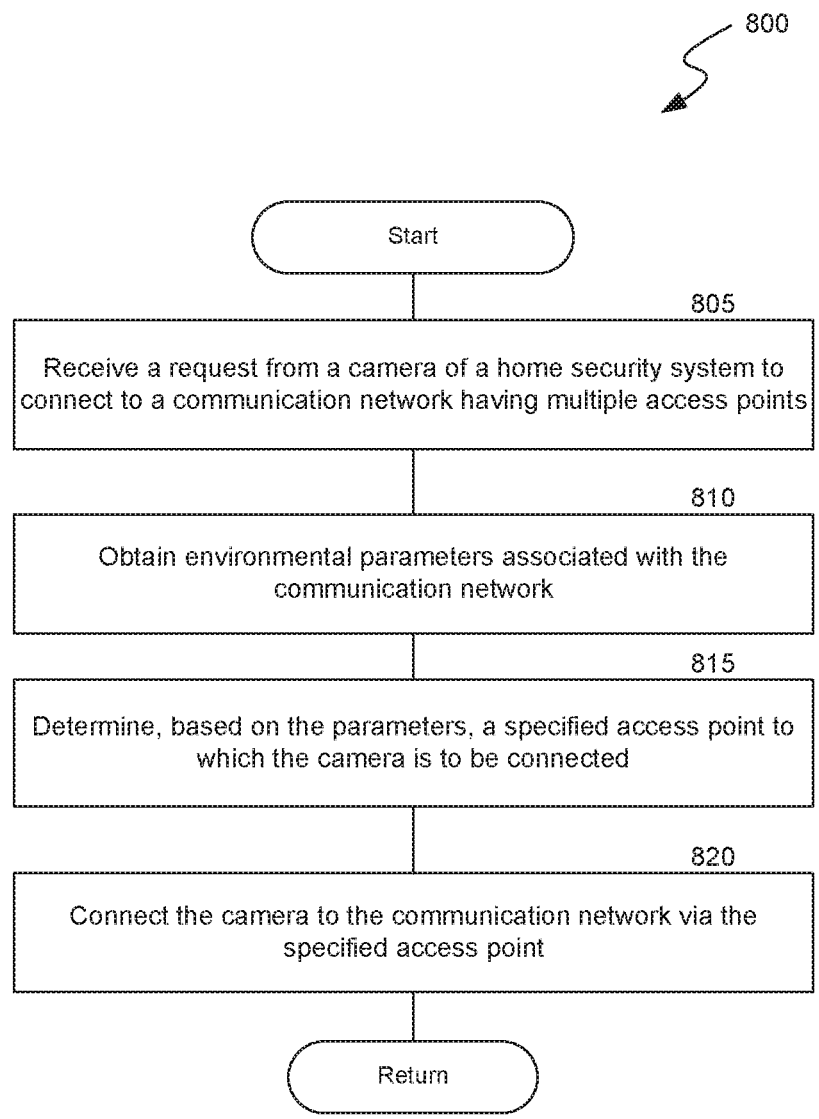
FIG. 8 is a flow diagram of a process for connecting a camera of the home security system to a communication network, consistent with various embodiments.

FIG. 8 is a flow diagram of a process 800 for connecting a camera of a home security system to a communication network, consistent with various embodiments. In some embodiments, the process 800 can be implemented in the environment 100 of FIG. 1. At block 805, the request receiving component 715 receives a request from a specified camera of the home security system 150 to connect to the communication network 130 having multiple access points 110. For example, the request receiving component 715 receives a request from the camera 115d to connect to the communication network 130.

At block 810, the monitoring component 710 determines the environmental parameters associated with the communication network 130. For example, the environmental parameters of the communication network 130 include any of a signal strength between a component and each of the access points; a CPU usage, memory usage, and/or a throughput of the access points; or hardware/software capability of the component.

At block 815, the access point connection component 720 determines a specified access point of the communication network 130 to which the camera 115d is to be connected based on the environmental parameters. For example, the access point connection component 720 determines a specified access point that satisfies the selection criterion for hosting the camera 115d. In some embodiments, the selection criterion for selecting an access point includes at least one of (a) a load of the access point not exceeding a first specified threshold, where the load is a function of one or more of CPU usage, memory usage or a throughput of the access point, (b) a signal strength between the component and the access point being above a second specified threshold, (c) number of devices connected to the access point not exceeding a third specified threshold, or (d) hardware and/or software compatibility between the access point and the component. The access point connection component 720 determines that the access point 110*a* satisfies the selection criterion for hosting the camera 115*d*.

At block 820, the access point connection component 720 connects the camera 115*d* to the access point 110*a*, e.g., wirelessly.

Figure 9:
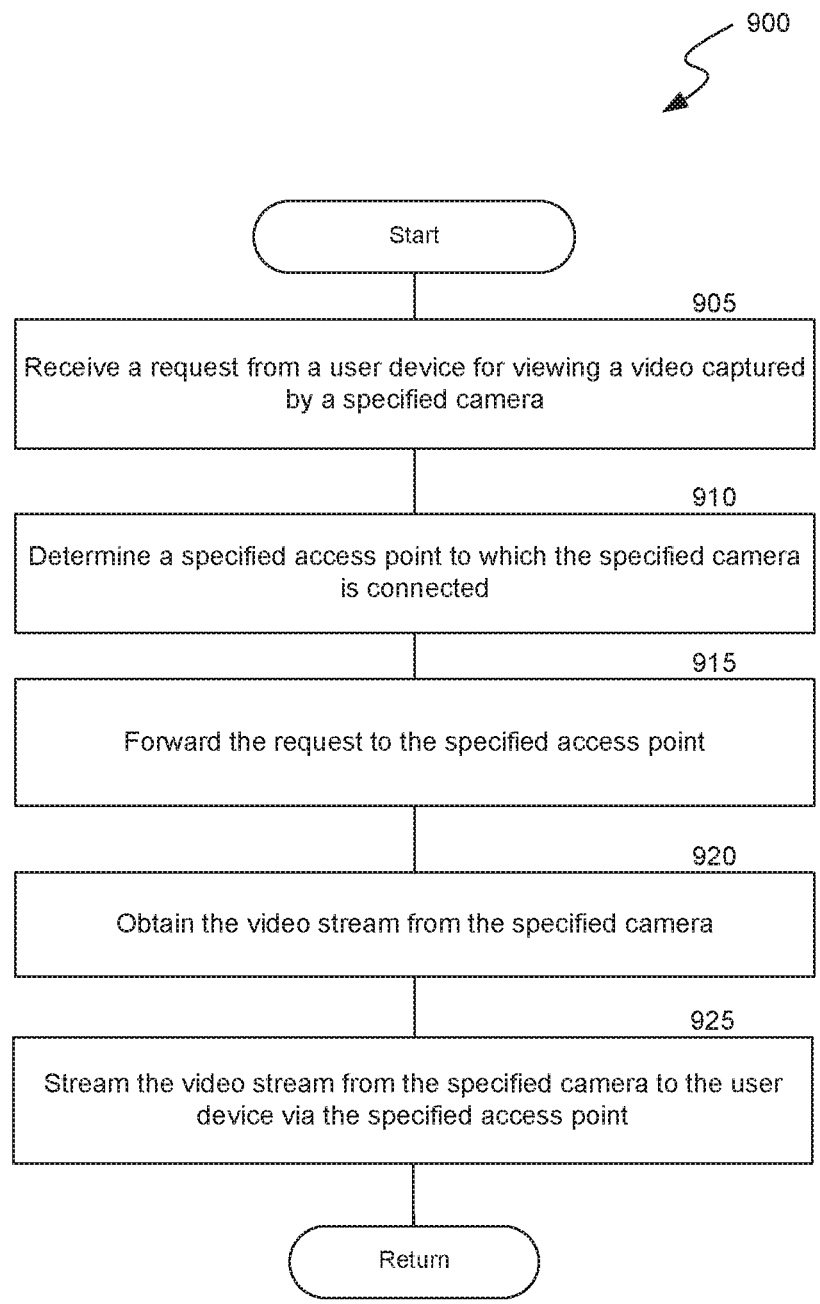
FIG. 9 is a flow diagram of a process for streaming a video feed from a camera of the home security system to a user device, consistent with various embodiments.

FIG. 9 is a flow diagram of a process 900 for streaming a video feed from a camera of the home security system to a user device, consistent with various embodiments. The process 900 may be implemented in the environment 100 of FIG. 1. At block 905, the request receiving component 715 receives a request from a user device for viewing a video captured by a specified camera. For example, the request receiving component 715 receives a request from the user device 165 for viewing a video captured by the camera 115*d*. In some embodiments, the request receiving component 715 in the access point to which the user device 165 is connected receives the request.

At block 910, the network component 705 determines a specified access point to which the specified camera is connected. For example, the network component 705 determines that the camera 115*d* is connected to the access point 110*a*. In some embodiments, the network component 705 maintains information regarding the devices in the communication network 130, such as identification (ID) of a device connected to the communication network 130, a type of the device, the Internet protocol (IP) address of the device, the access point to which the device is connected, etc. The network component 705 can store such information in a database, which can be stored in any of the access points, and use the information stored in the database to determine the access point to which a specified component of the home security system 150 is connected.

At block 915, the network component 705 forwards the request to the access point to which the specified camera is connected. For example, the network component 705 forwards the request to the access point 110*a*.

At block 920, the network component 705 obtains the video feed from the specified camera. For example, the network component 705 in the access point 110*a* obtains the video from the camera 115*d*.

At block 930, the network component 705 streams the video feed to the user device. In some embodiments, if the user device 165 is connected to an access point other than the specified access point to which the specified camera is connected, the specified access point forwards the video to the access point which the user device is connected, which then forwards the video to the user device 165. For example, the access point 110*a* forwards the video from the camera 115*d* to the access point 110*c*, which then forwards it to the user device 165.

Figure 10:
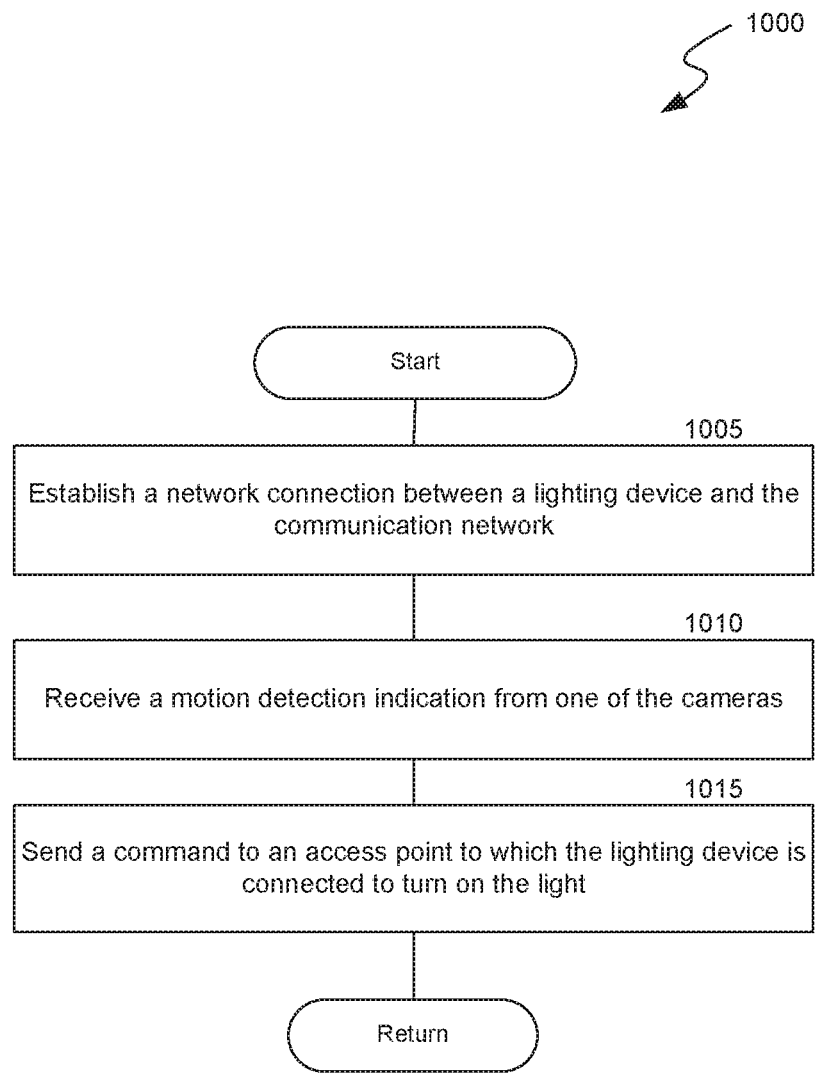
FIG. 10 is a flow diagram of a process for operating a lighting device in the home security system, consistent with various embodiments.

FIG. 10 is a flow diagram of a process 1000 for operating a lighting device in the home security system, consistent with various embodiments. The process 1000 may be implemented in the environment 100 of FIG. 1. At block 1005, the access point connection component 720 establishes a network connection for a lighting device with a communication network. For example, the access point connection component 720 establishes a network connection for the lighting device 116*a* with the communication network 130. In some embodiments, the access point connection component 720 establishes the network connection for the lighting device 116*a* with the access point 110*c* using the selection criterion described at least with respect to FIGS. 1 and 3. The lighting device 116*a* may be connected to the access point 110*c* wirelessly, e.g., via Bluetooth.

At block 1010, the network component 705 receives an indication of a motion being detected by one of the cameras. For example, the network component 705 receives an indication from the camera 115*e* that a motion was detected by the camera 115*e*.

At block 1015, the network component 705 sends a command to a specified lighting device to turn on the light in response to the motion. For example, the network component 705 sends a command to the lighting device 116*a* to turn on the light in response to the motion detected by the camera 115*e*. In some embodiments, the network component 705 checks the database for determining a specified task to be performed in response to specified events. The database can store information that specifies which component of the home security system 150 has to perform what task in response to a specified event. For example, the information stored in the database can indicate that the lighting device 116*a* is to be turned on in response to a motion detected by the camera 115*d*. In some embodiments, the network management system 105 may determine the specified lighting devices to be turned on based on an actual location of the user 170 or a prediction of the location of the user 170, which can be done using AI and ML techniques.

Figure 11:
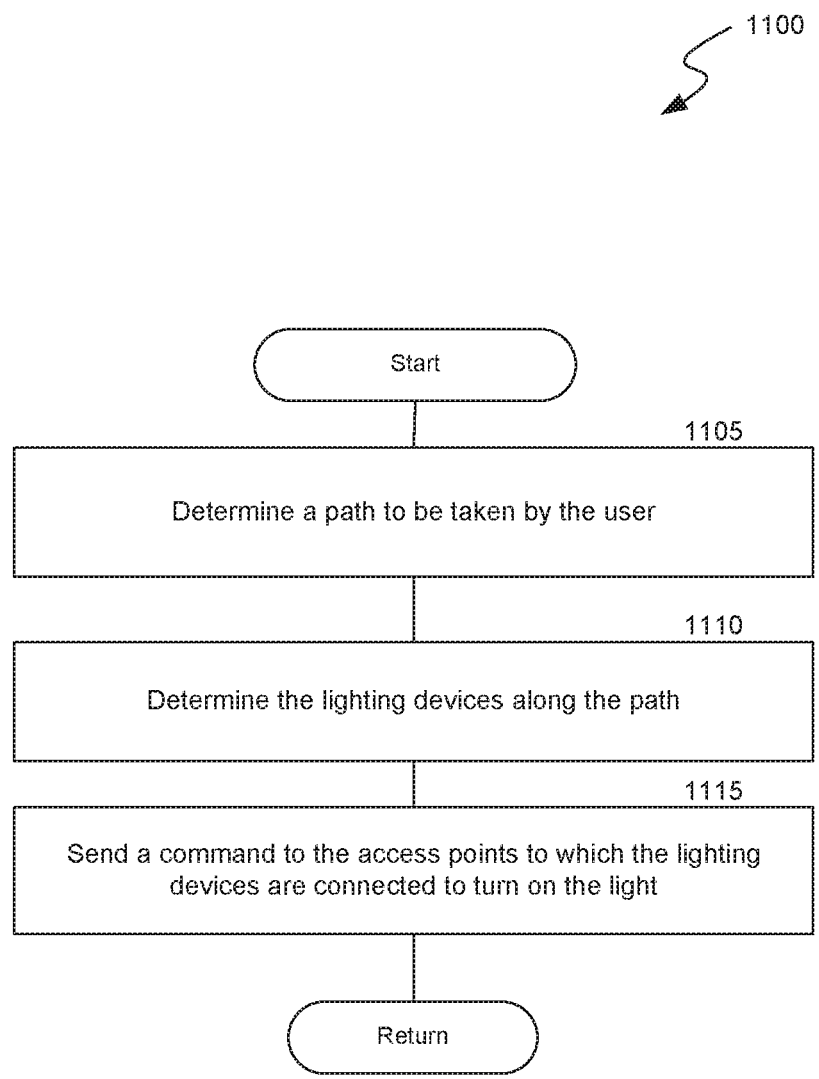
FIG. 11 is a flow diagram of a process for determining a set of lighting devices to be turned on in the home security system, consistent with various embodiments.

FIG. 11 is a flow diagram of a process 1100 for determining a set of lighting devices to be turned on in the home security system, consistent with various embodiments. The process 1100 may be implemented in the environment 100 of FIG. 1. The process 1100 may also be performed as part of block 1015 of process 1000. At block 1105, the network component 705 determines a path taken or to be taken by the user 170, e.g., after a motion is detected by a specified camera. For example, the network component 705 determines a path taken or to be taken by the user 170 after a motion is detected by the camera 115*e*.

In determining the path taken by the user 170, the network component 705 can determine the location of the user 170, e.g., based on the location of the user device 165 or based on the location the user 170 itself, as described at least with respect to FIG. 3.

In predicting the path to be taken by the user 170 in response to a specified event such as detecting a motion by a specified camera, the network component 705 can predict the path to be taken by the user 170 using AI and ML techniques, e.g., based on past movements of the user 170 recorded by the network management system 105 over a period, as described at least with reference to FIG. 3.

At block 1110, the network component 705 determines the lighting devices along the path. In some embodiments, the network component 705 also determines the access points to which those lighting devices are connected.

At block 1115, the network component 705 sends a command to the access points to which the lighting devices are connected to turn on the light. Upon receiving, the instructions from the network component 705, each of the access points send a command to the corresponding lighting devices to turn on the light.

Figure 12:
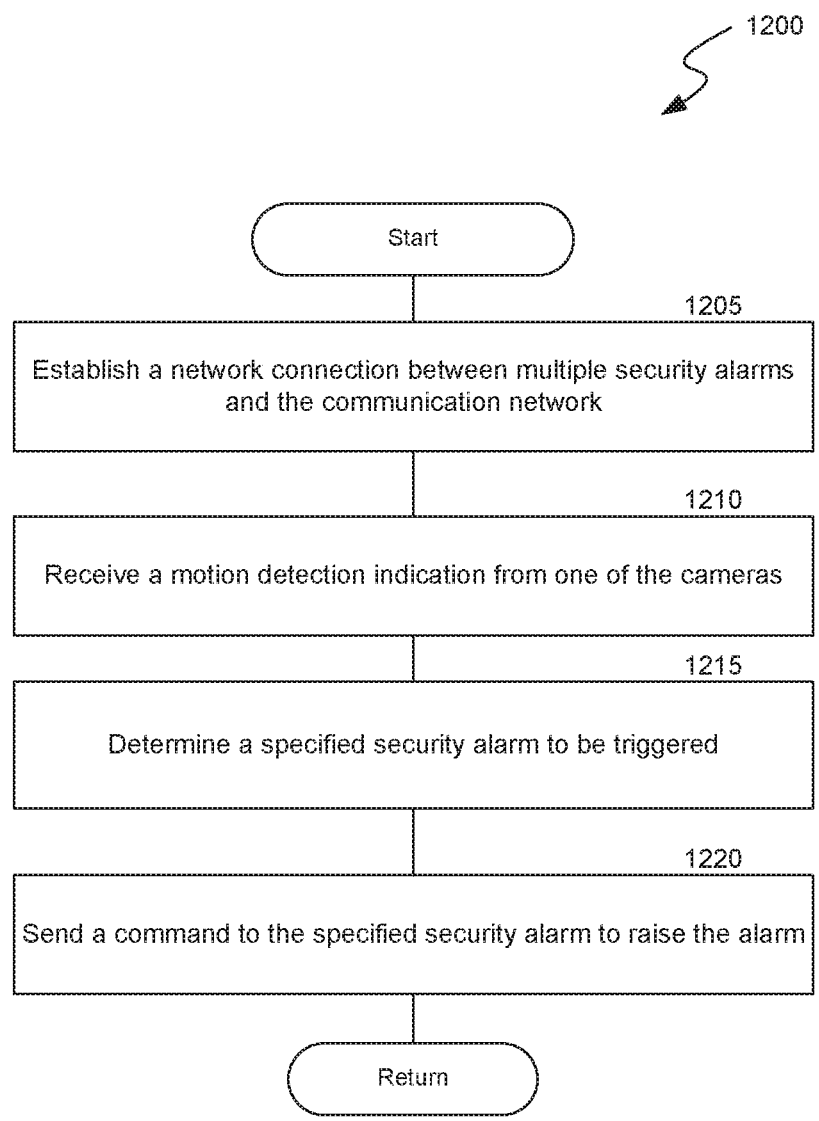
FIG. 12 is a flow diagram of a process for operating a security alarm in the home security system, consistent with various embodiments.

FIG. 12 is a flow diagram of a process 1200 for operating a security alarm in the home security system, consistent with various embodiments. The process 1200 may be implemented in the environment 100 of FIG. 1. At block 1205, the access point connection component 720 establishes a network connection for multiple security alarms with a communication network. For example, the access point connection component 720 establishes a network connection for the security alarm 117 with the communication network 130. In some embodiments, the access point connection component 720 establishes the network connection for the security alarm 117 with the access point 110a using the selection criterion described at least with respect to FIG. 1. The security alarm 117 may be connected to the access point 110a wirelessly. In some embodiments, the security alarm 117 may be integrated with the access point 110a, and can connect to the communication network 130 automatically upon connecting the access point 110a to the communication network 130.

At block 1210, the network component 705 receives an indication of a motion being detected by one of the cameras. For example, the network component 705 receives an indication from the camera 115e that a motion was detected by the camera 115e.

At block 1215, the network component 705 determines a specified security alarm to be triggered in response to detecting a motion being by a specified camera. In some embodiments, the network component 705 checks the database for determining a specified task to be performed in response to a specified event. The tasks to be performed by the components of the home security system 150 in response to the events may be user-defined. The database can store information that specifies which component of the home security system 150 has to perform what task in response to a specified event. For example, the information stored in the database can indicate that the security alarm 117 is to be triggered in response to a motion detected by the camera 115e. The network component 705 also determines the access point to which the specified security alarm is connected. For example, the network component determines that the security alarm 117 is connected to the access point 110a.

At block 1220, the network component 705 sends a command to the specified security alarm to raise the alarm in response to the motion. For example, the network component 705 sends a command to the security alarm 117 to raise the alarm in response to the motion detected by the camera 115e. In some embodiments, if the security alarm that is to be triggered and the camera that detected the motion are connected to different access points, then the access point to which the camera is connected sends an instruction to the access point to which the security alarm is connected to command the security alarm to raise an alarm.

Figure 13:
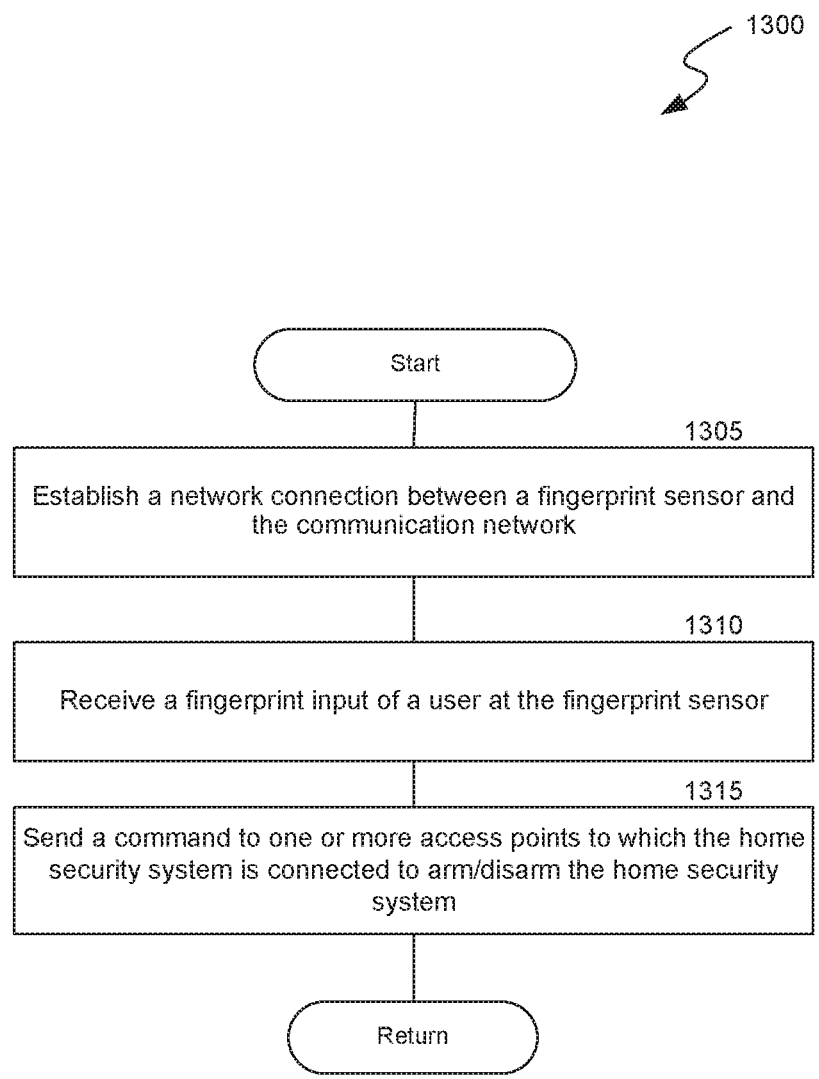
FIG. 13 is a flow diagram of a process for operating a fingerprint sensor in the home security system, consistent with various embodiments.

FIG. 13 is a flow diagram of a process 1300 for operating a fingerprint sensor in the home security system, consistent with various embodiments. The process 1300 may be implemented in the environment 100 of FIG. 1. At block 1305, the access point connection component 720 establishes a network connection for a fingerprint sensor with a communication network. For example, the access point connection component 720 establishes a network connection for the fingerprint sensor 118 with the communication network 130. In some embodiments, the access point connection component 720 establishes the network connection for the fingerprint sensor 118 using the selection criterion described at least with respect to FIG. 1. The fingerprint sensor 118 may be connected to the access point 110c wirelessly. In some embodiments, the fingerprint sensor 118 may be integrated with the access point 110c, and can connect to the communication network 130 automatically upon connecting the access point 110c to the communication network 130.

At block 1310, the fingerprint sensor receives a fingerprint input of a user. For example, the fingerprint sensor 118 receives a fingerprint input 408 of the user 170.

At block 1315, the network component 705 sends a command to one or more access points to arm/disarm the home security system. Upon receiving the fingerprint input 408 the network component 705 authenticates the fingerprint 408 to determine whether the fingerprint 408 is of a user who can arm/disarm the home security system 150. If the fingerprint 408 is of a user who can arm/disarm the home security system 150, e.g., the user 170, the network component 705 proceeds with performing the specified task. In an event the home security system 150 is armed, it is disarmed upon authenticating the fingerprint 408. In an event the home security system 150 is disarmed, it is armed upon authenticating the fingerprint 408. The fingerprint sensor 118 or the access point 110c may have an output device, e.g., a display or a speaker, that indicates a status of the home security system, e.g., armed or disarmed. Upon determining that the home security system 150 is to be armed or disarmed, the network component 705 identifies the access points to which the components of the home security system 150 that are to be armed or disarmed are connected, e.g., access point 110a to which security alarm 117 is connected, and sends an instruction to the access point 110a to command the security alarm 117 to arm/disarm.

Figure 14:
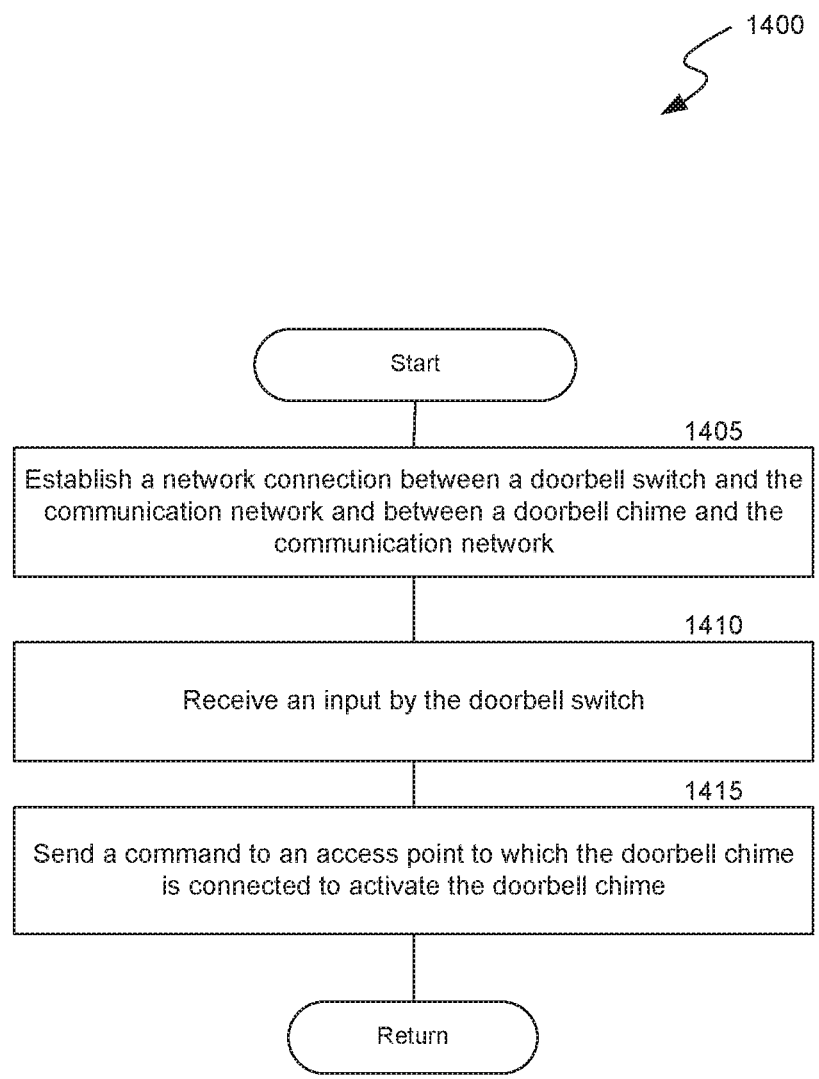
FIG. 14 is a flow diagram of a process for operating a doorbell switch and doorbell chime in the home security system, consistent with various embodiments.

FIG. 14 is a flow diagram of a process 1400 for operating a doorbell switch and doorbell chime in the home security system, consistent with various embodiments. The process 1400 may be implemented in the environment 100 of FIG. 1. At block 1405, the access point connection component 720 establishes a network connection for the doorbell switch and the doorbell chime with a communication network. For example, the access point connection component 720 establishes a network connection for the doorbell switch 119 and the doorbell chime 120 with the communication network 130. The doorbell switch 119 and doorbell chime 120 can connect to the communication network 130 by connecting to an access point or a camera in the communication network 130. In some embodiments, the doorbell switch 119 and the doorbell chime 120 connect to communication network 130 by connecting to the access point 110b and access point 110a, respectively. The doorbell switch 119 and the doorbell chime 120 connect to communication network 130 wirelessly, e.g., via Bluetooth.

At block 1410, the network component 705 receives an indication that an input is received from a doorbell switch, e.g., doorbell switch 119 is pressed.

At block 1415, the network component 705 performs one or more tasks associated with the doorbell switch press. For example, one task can be to be ring a doorbell chime 120 in response to pressing of the doorbell switch 119. Upon determining that the doorbell chime 120 is to be ringed, the network component 705 sends an instruction to the access point 110a associated with the doorbell chime 120 to command the doorbell chime 120 to ring the bell. In another example, a first task can be to be ring the doorbell chime 120 and a second task is to capture the video from an associated camera, e.g., the camera 115b, and stream the video to the user device 165 in response to pressing of the doorbell switch 119. The user 170 may configure one or more of the tasks to be performed by one or more of the components of the home security system 150 in response to pressing of the doorbell switch 119.

Figure 15:
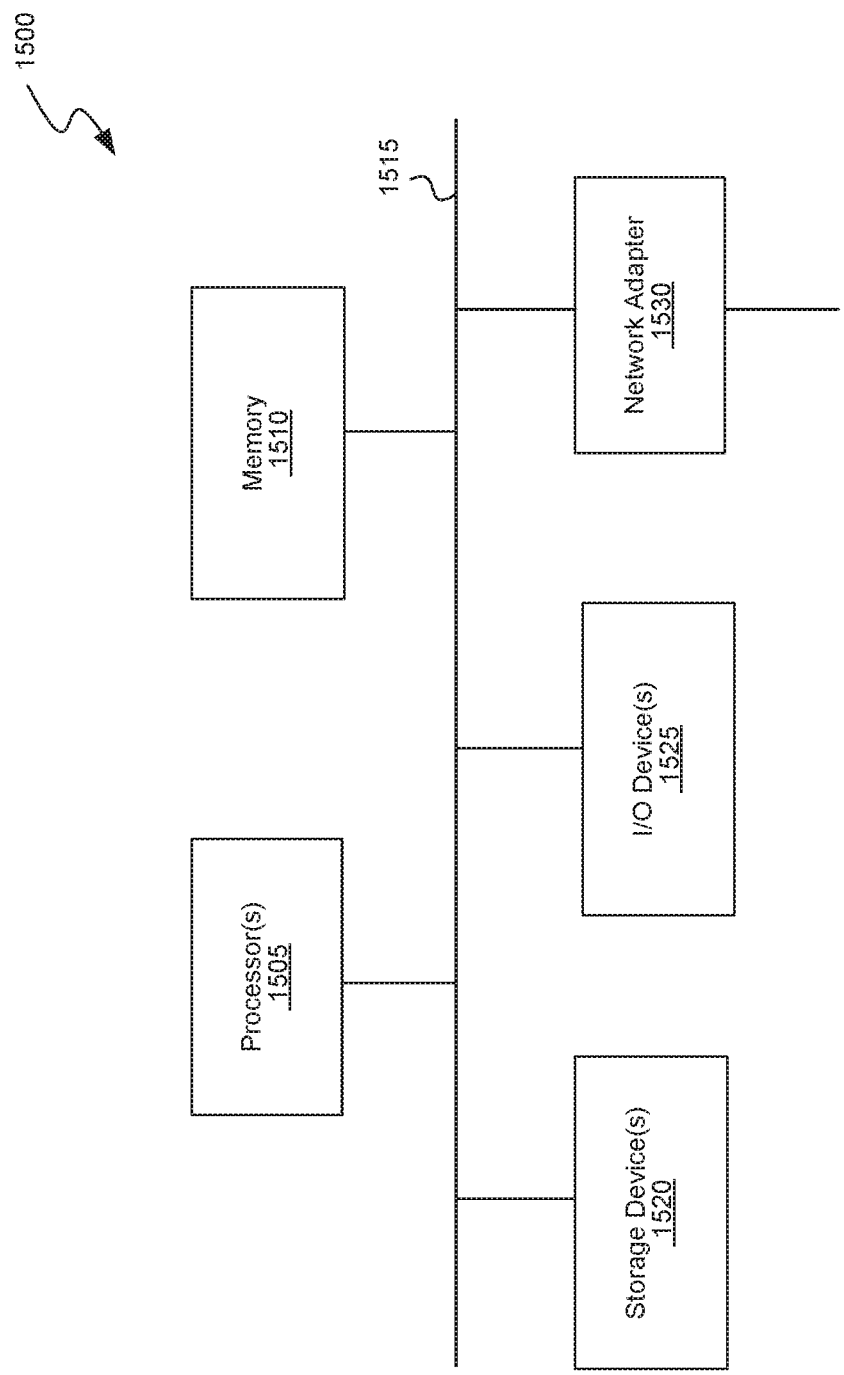
FIG. 15 is a block diagram of a computer system as may be used to implement features of some embodiments of the disclosed technology.

FIG. 15 is a block diagram of a computer system as may be used to implement features of some embodiments of the disclosed technology. The computing system 1500 may be used to implement any of the entities, components, modules, interfaces, or services depicted in the foregoing figures (and in this specification). The computing system 1500 may include one or more central processing units ("processors") 1505, memory 1510, input/output devices 1525 (e.g., keyboard and pointing devices, display devices), storage devices 1520 (e.g., disk drives), and network adapters 1530

(e.g., network interfaces) that are connected to an interconnect 1515. The interconnect 1515 is illustrated as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1510 and storage devices 1520 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1510 can be implemented as software and/or firmware to program the processor(s) 1505 to carry out actions described above. In some embodiments, such software or firmware may be initially provided to the processing system 1500 by downloading it from a remote system through the computing system 1500 (e.g., via network adapter 1530).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method comprising:
   receiving, at a network management system and from a first camera of multiple cameras of a home security system, a request to connect the first camera to a communication network for streaming video captured by the first camera to a user device, wherein one or more of the cameras are connected to a base station of the home security system, which streams video captured by the one or more of the cameras to the user device;
   obtaining, at the network management system, a first set of parameters associated with the first camera and a second set of parameters associated with multiple access points of the communication network,
   wherein the first set of parameters includes a camera-specific parameter associated with the first camera,
   wherein the camera-specific parameter is unique to camera-type devices,
   wherein the second set of parameters includes a non-camera-specific parameter associated with the multiple access points, and
   wherein the multiple cameras are placed at a first set of locations of a building and the multiple access points are placed at a second set of locations of the building, wherein the multiple access points establish the communication network as a mesh network;
   selecting, by the network management system, based on the first set of parameters and the second set of parameters, a first access point of the multiple access points to which the first camera is to be connected;
   forwarding, by the network management system, the request to the first access point selected by the network management system; and
   connecting the first camera to the communication network via the first access point selected by the network management system.

2. The method of claim 1, wherein the first set of parameters includes a video resolution of the first camera.

3. The method of claim 1, wherein the second set of parameters includes a throughput of the corresponding access point, a memory usage of the corresponding access point, CPU usage of the corresponding access point, and signal strength of a wireless signal from the corresponding access point to the first camera.

4. The method of claim 1, wherein determining the first access point includes:
   determining that a memory usage of the first access point is below a first specified threshold or a memory availability of the first access point is above a second specified threshold.

5. The method of claim 1, wherein determining the first access point includes:
   determining that a CPU usage of the first access point is below a first specified threshold or a processing capacity of the first access point is above a second specified threshold.

6. The method of claim 1, wherein determining the first access point includes:
   determining that a throughput of the first access point is below a first specified threshold.

7. The method of claim 1 further comprising:
   receiving a request from the user device for viewing the video captured by the first camera, and
   streaming the video from the first camera to the user device via the first access point.

8. The method of claim 1, wherein determining the first access point includes:
   determining whether to connect the first camera to the communication network via the base station or the first access point, and
   determining that the first camera is outside of a network coverage area of the base station and within the coverage area of the first access point or that a signal strength of a wireless signal between the base station and the first camera is below a specified threshold.

9. The method of claim 1, wherein determining the first access point includes:
   determining whether to connect the first camera to the communication network via the base station or the first access point, and
   determining that at least one of a throughput, CPU usage, or a memory usage of the base station is above a specified threshold.

10. The method of claim 1, wherein determining the first access point includes:
    receiving a request from the user device for viewing the video captured by at least some of the multiple cameras, determining that at least one of a throughput, CPU usage, or a memory usage of the base station is above a specified threshold,
connecting one or more of the multiple cameras to one or more of the multiple access points, and
transmitting video streams from the one or more of the multiple cameras to the user device via the one or more of the multiple access points.

11. The method of claim 1 further comprising:
determining one of the multiple access points on which to execute a video streaming service;
determining that at least one of a throughput, CPU usage, or a memory usage of a specified access point of the multiple access points is below a specified threshold; and
executing the video steaming service at the specified access point and an instruction to the camera to encode the video stream by adjusting a resolution of the video stream.

12. The method of claim 11 further comprising:
forwarding a video captured by one of the multiple cameras to the specified access point for streaming to a user device.

13. The method of claim 1, wherein obtaining the first set of parameters associated with the first camera and a second set of parameters associated with multiple access points of the communication network comprises:
monitoring the non-camera-specific parameter associated with the multiple access points.

14. The method of claim 1, wherein selecting the first access point of the multiple access points to which the first camera is to be connected comprises:
determining that the first access point operates more efficiently to support a streaming video of the first camera over the communication network compared to another of the multiple access points,
wherein the camera-specific parameter is associated with the streaming video of the first camera.

15. A computer-readable storage medium storing computer-readable instructions, comprising:
instructions for establishing a communication network using multiple access points, wherein the communication network is a mesh network;
instructions for establishing a network connection for a home security system having multiple cameras with the communication network,
wherein the establishing includes streaming a video captured by one of the multiple cameras to a user device of a user via one or more of the multiple access points;
instructions for receiving a request from a specified camera to connect to the communication network;
instructions for selecting, based on parameters associated with the specified camera and parameters associated with the multiple access points, a specified access point of the multiple access points to which the specified camera is to be connected,
wherein the first set of parameters includes a camera-specific parameter associated with the first camera,
wherein the camera-specific parameter is unique to camera-type devices,
wherein the second set of parameters includes a non-camera-specific parameter associated with the multiple access points, and
wherein the specified access point is selected by a device other than the specified camera; and
instructions for forwarding the request to the specified access point selected by the device other than the specified camera;
instructions for connecting the specified camera to the communication network via the specified access point selected by the device other than the specified camera.

16. The computer-readable storage medium of claim 15, wherein the instructions for adjusting the encoding of the video stream include:
instructions for determining that at least one of a throughput, CPU usage, or a memory usage of a base station of the home security system is above a first specified threshold, wherein the base station streams a video captured by one of the multiple cameras to the user device, and
instructions for determining that at least one of a throughput, CPU usage, or a memory usage of the specified access point is below a second specified threshold.

17. The computer-readable storage medium of claim 15 further comprising:
instructions for receiving a request from the user device for viewing the video captured by the specified camera, and
streaming the video from the specified camera to the user device via the specified access point.

18. A system, comprising:
a network component that is configured to manage a network connection for a home security system with a communication network, wherein the communication network is a mesh network generated using multiple access points,
wherein the home security system includes and multiple cameras;
a monitoring component that is configured to monitor a first set of parameters including a non-camera-specific parameter associated with the multiple access points;
a request receiving component that is configured to receive a request from a specified camera of the home security system to connect the specified camera to the communication network,
wherein the specified camera is associated with a second set of parameters including a camera-specific parameter, and
wherein the camera-specific parameter is unique to camera-type devices; and
an access point connection component that is configured to:
select, based on the first set of parameters and the second set of parameters, a specified access point of the multiple access points to which the specified camera is to be connected, wherein the specified access point is selected by a device other than the specified camera,
forwarding the request to the specified access point selected by the device other than the specified camera; and
connect the specified camera to the communication network via the specified access point selected by the device other than the specified camera, wherein the specified camera is configured to stream a video captured by the specified camera to a user device via the specified access point selected by the device other than the specified camera.

19. The system of claim 18, wherein the first set of parameters include at least one of a throughput, CPU usage, or a memory usage of the multiple access points.

20. The system of claim 18, wherein the access point connection component is configured to determine the specified access point by:
  determining that at least one of a throughput, CPU usage, or a memory usage of a base station of the home security system is above a first specified threshold, wherein the base station streams a video captured by one of the multiple cameras to the user device, and
  instructions for determining that at least one of a throughput, CPU usage, or a memory usage of the specified access point is below a second specified threshold.

\* \* \* \* \*